United States Patent
Luu et al.

(10) Patent No.: US 7,460,181 B2
(45) Date of Patent: Dec. 2, 2008

(54) BLUE STRETCH USING RESTRICTED COLOR RANGE AND SOFT TRANSITION BOUNDARY

(75) Inventors: Sheena Luu, Winnipeg (CA); Andrew Mackinnon, North York (CA)

(73) Assignee: Genesis Microchip Inc., Santa Clara, CA (US)

( * ) Notice: Subject to any disclaimer, the term of this patent is extended or adjusted under 35 U.S.C. 154(b) by 705 days.

(21) Appl. No.: 11/042,417

(22) Filed: Jan. 24, 2005

(65) Prior Publication Data

US 2006/0082687 A1      Apr. 20, 2006

Related U.S. Application Data

(60) Provisional application No. 60/619,112, filed on Oct. 15, 2004.

(51) Int. Cl.
 H04N 9/64      (2006.01)
(52) U.S. Cl. .................. 348/649; 348/652; 348/655
(58) Field of Classification Search ............ 348/649, 348/776–779, 806–807, 223.1, 630, 652, 348/655; 358/516; *H04N 9/73, 9/64*
See application file for complete search history.

(56) References Cited

U.S. PATENT DOCUMENTS

| | | | |
|---|---|---|---|
| 4,694,330 A | | 9/1987 | Tanaka et al. |
| 5,177,599 A | | 1/1993 | Takagi et al. |
| 5,420,630 A | | 5/1995 | Takei |
| 5,530,474 A | * | 6/1996 | Takei ...................... 348/224.1 |
| 5,712,691 A | * | 1/1998 | Brennesholtz ............... 348/744 |
| 7,352,409 B2 | * | 4/2008 | Ueki .......................... 348/649 |
| 2002/0018129 A1 | | 2/2002 | Ikeda |
| 2003/0043394 A1 | | 3/2003 | Kuwata et al. |
| 2003/0184660 A1 | * | 10/2003 | Skow ....................... 348/223.1 |
| 2003/0189672 A1 | | 10/2003 | Ueki |

FOREIGN PATENT DOCUMENTS

| | | |
|---|---|---|
| EP | 1 335 583 | 8/2003 |
| EP | 1 339 239 | 8/2007 |

OTHER PUBLICATIONS

"Integrated Circuits, Data Sheet, YUY One Chip Picture Improvement based on Iuminanace Vector -, Colour Cector- and Spectral Processor", Philips Semiconductors, Sep. 24, 1999.
European Examination Report in corresponding Patent Application No. 05256356.6 dated Jun. 11, 2008.

* cited by examiner

*Primary Examiner*—Trang U Tran
(74) *Attorney, Agent, or Firm*—Beyer Law Group LLP

(57) ABSTRACT

System and method for increasing the blue component of white and near white pixels while avoiding hard transitions and without affecting flesh-tone colors. Pixels that are bright enough and fall within a detection area in the UV-plane have their blue components increased and their red components decreased. The detection area is limited to avoid application of blue stretch to flesh-tone colors. A transition boundary is provided around the detection area for gradually decreasing the amount of blue stretch as pixels move away from the boundary of the detection area, thereby avoiding hard transitions between areas that are blue stretched and areas that are not blue stretched.

29 Claims, 4 Drawing Sheets

BLUE STRETCH USING RESTRICTED COLOR RANGE AND SOFT TRANSITION BOUNDARY

This application claims priority of U.S. provisional application No. 60/619,112 filed on Oct. 15, 2004 which is hereby incorporated by reference.

BACKGROUND OF THE INVENTION

The present invention relates generally to adjusting pixel colors for display and, more particularly, to increasing the blue component in white and near white colors.

"Blue stretch" refers to increasing the blue value of white and near white colors in order to make whites appear brighter to the eye. When applying blue stretch to a set of pixels it is desirable to avoid blue stretching pixels in specified color ranges. Furthermore, it is desirable to prevent visible boundaries between areas that have been blue stretched and areas that have not been blue stretched.

Therefore, what is needed is a system and method for increasing the blue component of white and near white pixels while avoiding hard transitions and without affecting pixels in specified color ranges.

SUMMARY OF THE INVENTION

To achieve the foregoing and other objects and according to the purpose of the present invention, what is provided is a system and method for increasing the blue component of white and near white pixels while avoiding hard transitions and without affecting pixels in specified color ranges. Pixels that are bright enough and fall within a detection area in the UV-plane have their blue components increased and their red components decreased. The detection area is limited to avoid application of blue stretch to pixels in specified color ranges. A transition boundary is provided around the detection area for gradually decreasing the amount of blue stretch as pixels move away from the boundary of the detection area, thereby avoiding hard transitions between areas that are blue stretched and areas that are not blue stretched.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
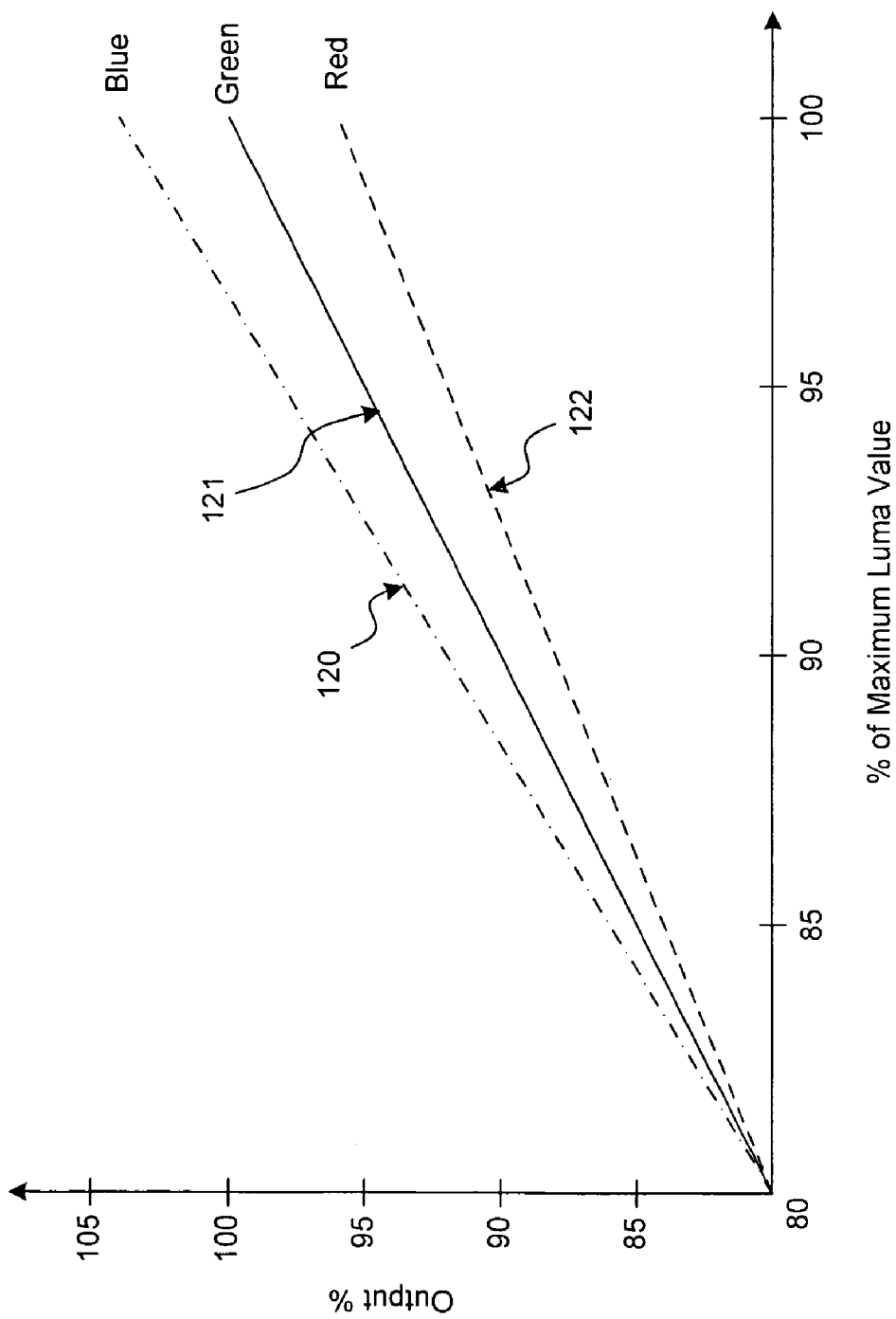
FIG. 1 is a graph illustrating the application of blue stretch, in accordance with an embodiment of the present invention.

In the following description, numerous specific details are set forth in order to provide a thorough understanding of the present invention. It will be understood, however, to one skilled in the art, that the present invention may be practiced without some or all of these specific details. In other instances, well known color space concepts and hardware design processes have not been described in detail in order not to unnecessarily obscure the present invention.

Accordingly, what is provided is a system and method for increasing the blue component in white and near white pixels in order for those pixels to appear brighter to the eye, while at the same time avoiding hard transitions and without affecting pixels in specified color ranges.

Although in the following description it is assumed that image pixel colors are expressed using the YUV color model (and occasionally the RGB color model), it will be understood to one of ordinary skill in the art that conversion between different color models may be used to apply the present invention.

The inputs to the disclosed blue stretch algorithm are the Y, U and V components of a pixel value. Pixels having a luma value greater than a specified fraction of the maximum possible luma value are deemed bright enough to be blue stretched. To determine the amount of blue stretch to be applied to such a pixel, a detection area having a transition boundary is defined in the UV-plane. Pixels that fall within the detection area are blue stretched the most. Pixels that are outside the detection area but within the transition boundary are blue stretched to a lesser degree, with the amount of blue stretch decreasing as the distance from the pixel to the edge of the detection area increases. The detection area is properly limited in order to avoid blue stretching pixels in specified color ranges. Options are provided to help prevent overshooting maximum allowed blue values.

Minimum Luma Value and Blue Gain Factor

A pixel is deemed bright enough and hence eligible for blue stretch if its luma (Y) value is greater than a minimum luma value, expressed as a minimum luma percentage of the maximum possible Y-value. In the described embodiment, an exemplary minimum luma percentage range of about 70% to 90% works well. By way of example, a minimum luma percentage of about 80% of the maximum possible Y-value has been found to work well. The minimum luma percentage is applied to whatever range is used for the pixel luma values (e.g. 16 to 235 versus 0 to 255), thereby preventing the blue stretched luma values from overshooting the upper limit of the particular luma range in use.

Applying blue stretch to a pixel that is bright enough comprises increasing the blue (U) value and decreasing the red (V) value of the pixel by a blue gain factor in a predetermined range, although as described below different pixels may receive different degrees of blue stretch. It should be noted that a range of about 2% to 10% works well. Since application of blue gain values above 10% generally results in noticeable blue tinting of the image, blue gain values are preferably kept below 10%. However, if the particular application allows for noticeable blue tinting, the blue gain factor can be increased. Conversely, if the application comprises mainly grayscale pixels, a blue gain value above 6% may result in whites appearing unnaturally blue. By way of example, a blue gain factor of about 4% has been found to work well.

The amount of blue stretch applied to a pixel depends on the location of the pixel within the UV-plane. If the pixel falls within the specified detection area in the UV-plane, it is blue stretched according to the full value of the specified blue gain factor. This is referred to as "full blue stretch". If the pixel falls outside of the detection area but is inside the transition boundary area around the detection area, the pixel is blue stretched according to a fraction of the blue gain factor, with the fraction decreasing linearly as the distance from the pixel to the edge of the detection area increases. This is referred to as "partial blue stretch" and allows for soft transition between pixels that are blue stretched and pixels that are not blue stretched. The transition boundary and partial blue stretch are described in more detail below.

FIG. 1 is a graph illustrating the application of blue stretch, in accordance with an embodiment of the present invention. The horizontal axis represents the pixel's luma expressed as a percentage of the maximum Y-value. The vertical axis represents the output level of each component (blue, red and green) after a full blue stretch, expressed as a percentage of maximum Y-value. As shown in FIG. 1, pixels above the minimum luma value of 80% of maximum Y-value have their blue and red components adjusted according to the blue gain.

As shown in FIG. 1, the blue (U) value is increased by about 4% (shown by the dotted line 120), the red (V) value is decreased by about 4% (shown by the dotted line 122), and the green (Y) value is unchanged (shown by the dotted line 121).

Avoiding Pixels in Specified Color Ranges

Figure 2:
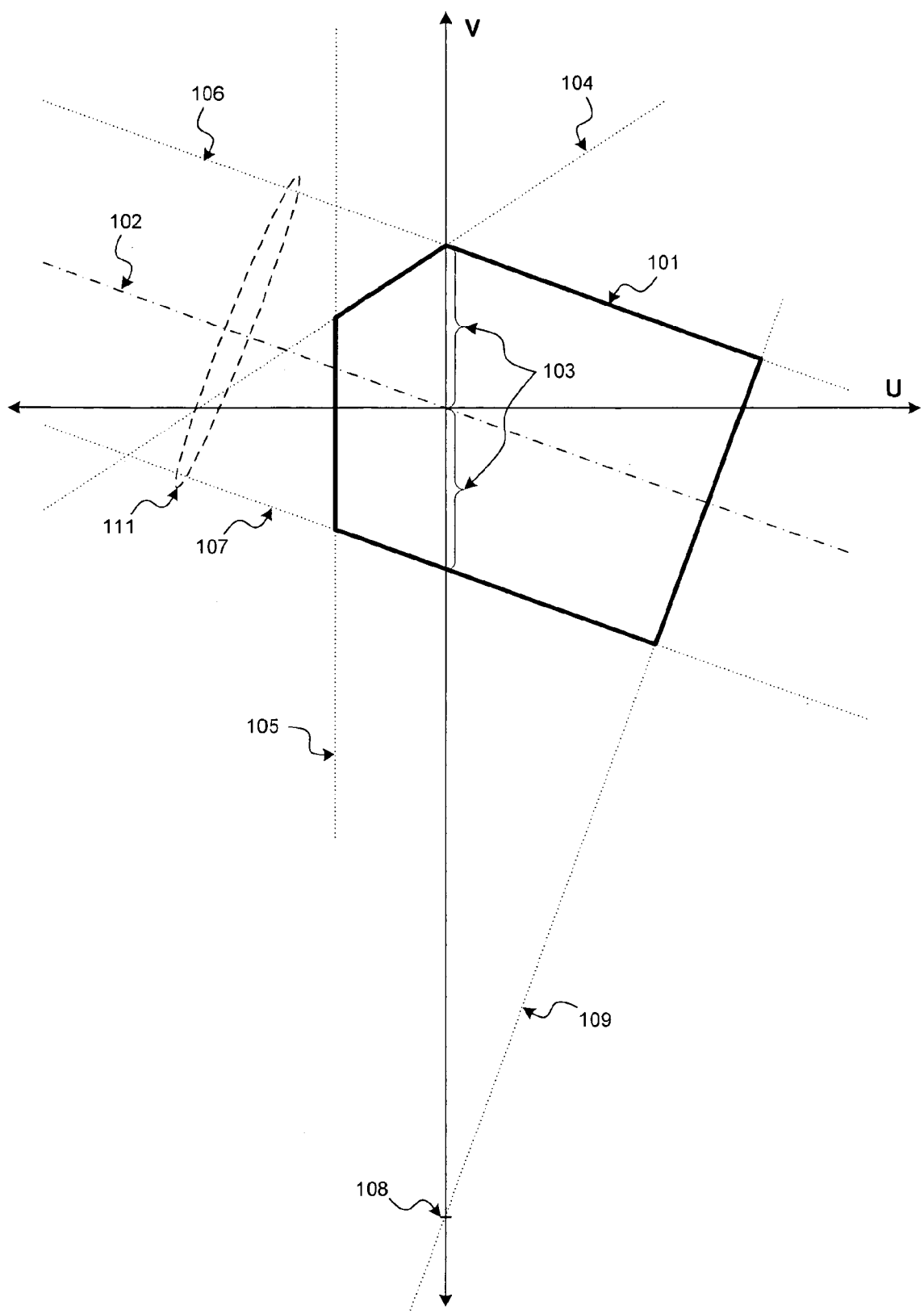
FIG. 2 is a graph in the UV-plane defining a detection area, in accordance with an embodiment of the present invention.

Blue stretch is generally applied to white and near white colors in order to make them appear brighter to the eye. FIG. 2 illustrates the UV-plane and shows a detection axis 102 oriented about −30° from the U-axis positioned along the white and near white colors in the YUV-color space. The origin of the graph represents the grayscale values. Upper and lower boundary lines 106 and 107 define between them a band 111 running along the white and near white colors. An area parameter 103 indicates the (vertical) width of the band 111 as measured vertically from the detection axis 102 to the boundary lines 106 and 107. The area parameter 103 and its negative indicate where the upper and lower boundary lines 106 and 107 cross the V-axis.

When applying blue stretch, it may be desirable to avoid blue stretching pixels in specified color ranges. In such a case, application of blue stretch is limited to pixels that fall within a detection area 101 represented as a subset of the band 111 in the UV-plane. The detection area is defined by limiting the band 111 using boundary lines that segregate away specified color ranges in the UV-plane (indicating the specified color ranges to avoid) from the band 111.

One example of such a specified color range to avoid is represented by the flesh-tone colors, since the human eye is sensitive to flesh-tones and readily perceives a blue tint in flesh-tone colors as unnatural. Accordingly, one embodiment of the present invention blue stretches whites and near whites while avoiding blue stretching pixels that fall within flesh-tone colors. Specifically, in order to prevent blue stretching pixels in deeper regions of the yellow, orange and green areas of the UV-plane and causing excessive adjustment to such hues, two parameters are introduced: a Yellow Option (Y_Option) 104 and a Green Option (G_Option) 105.

As shown in FIG. 2, the Y_Option 104 represents a boundary line limiting the band 111 in the yellow-orange region. The G_Option 105 represents a vertical boundary line, limiting the band 111 in the yellow-green region by setting a minimum U-value in the range of about −15 to 10 (for RGB values ranging from 0 to 255). By way of example, a minimum U-value of −3 has been found to work well. The combination of the G_Option 105 and the Y_Option 104 prevents blue stretch from affecting flesh-tone colors.

Furthermore, in order to control the saturation range in which blue stretch is applied, a saturation limit line 109 is defined. As shown in FIG. 2, the saturation limit line is perpendicular to the detection axis 102 and comprises a slope of about 60° from the U-axis. The saturation limit line 109 is defined by a saturation limit parameter 108 representing a V-intercept.

The detection area 101 is simply the result of limiting the band 111 by the boundary lines for avoiding specific color ranges, as well and the boundary line for controlling the saturation range in which blue stretch is applied.

Soft Transition Boundary

Figure 3:
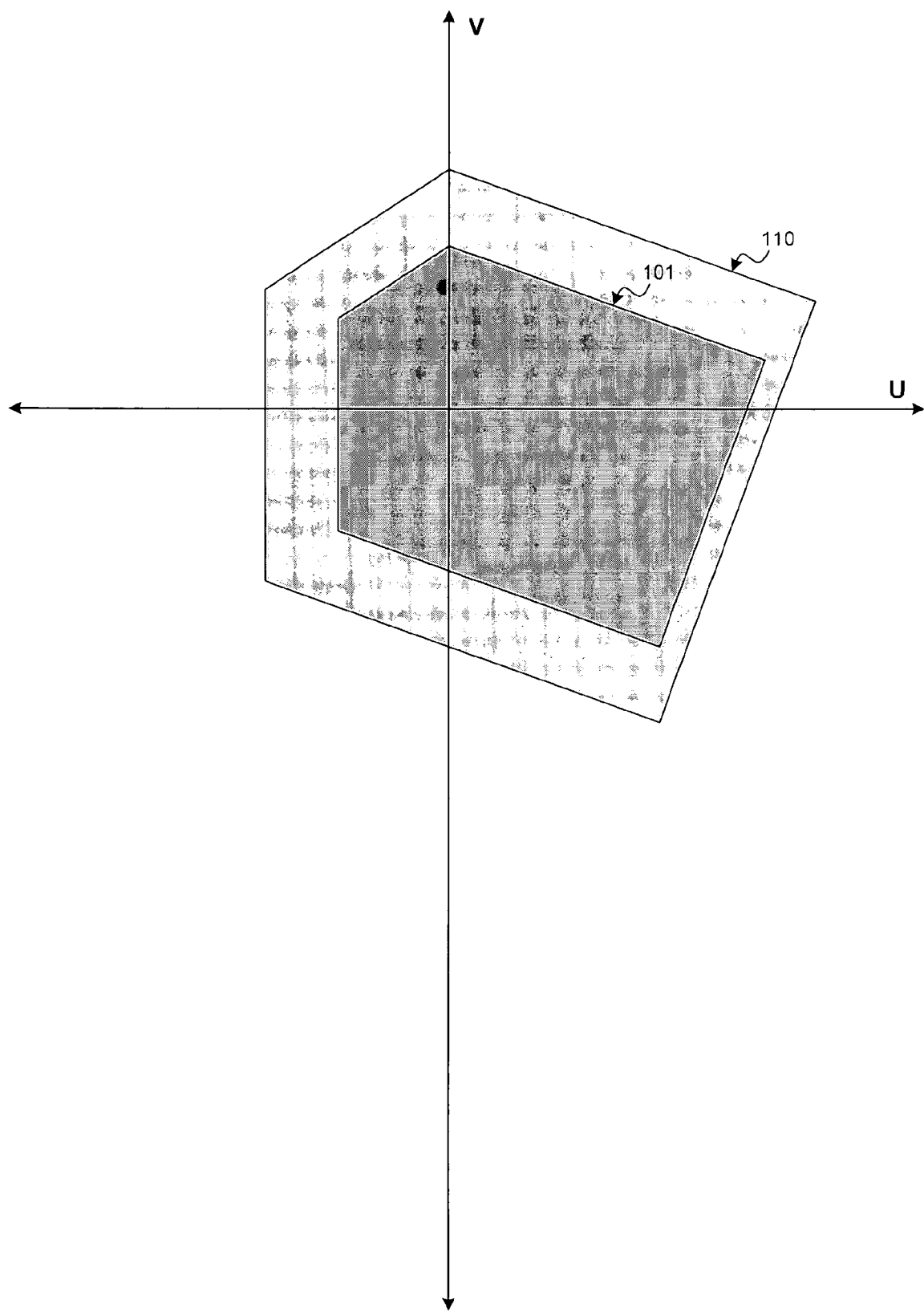
FIG. 3 is a graph in the UV-plane illustrating a soft transition boundary added around the detection area, in accordance with an embodiment of the present invention.

To prevent visible boundaries between areas that have been blue stretched and areas that have not been blue stretched, a soft transition boundary 110 is added around the detection area 101 defined above, as illustrated in FIG. 3 in accordance with an embodiment of the present invention. The soft transition boundary 110 is used to extend the detected region beyond the detection area 101 by a soft boundary parameter s representing an offset off of the hard boundary of detection area 101. The blue gain applied to pixel values that lie between the hard and soft boundary is linearly decreased by the amount the pixel values extend beyond the hard boundary.

If the pixel's chroma (U and V) values fall within the detection area 101, the pixels is blue stretched according to the full value of the blue gain factor. If the pixel falls outside of the detection area 101, the distance from the edge of the detection area 101 is computed.

For a pixel that is not to the left of the G_Option 105 boundary, this distance is defined as the vertical distance from the pixel to the edge of the detection area 101. For pixels that are to the left of the G_Option 105 boundary, the distance is defined as the larger of (1) the horizontal distance from the minimum U-value, and (2) the vertical distance from the closest of the two boundary lines 107 and 104. The transition boundary 110 is simply the region where the distance thus defined is within a defined threshold. By way of example, a threshold value of 8 (for RGB values ranging from 0 to 255) has been found to work well.

Pixels that are outside the detection area 101 but fall within the transition boundary 110 are blue stretched according to a fraction of the blue gain factor, with the fraction linearly decreasing with increasing distance from the pixel to the edge of the detection area 101. By way of example, the fraction is set to about 100% at the boundary of the detection area 101, and set to about 0% at the outer edge of the transition boundary 110.

Overshooting a Maximum Allowed Blue Value

When increasing the blue component of pixels in a blue stretch, it is possible to produce values of blue great than the maximum blue value (e.g. 255). There are several options for dealing with the overshooting of the maximum allowed blue value:

(1) Simply clamp the blue values in the allowable blue range (e.g. 0 to 255).
(2) Limit the blue component by the maximum allowable blue value (e.g. 255) and rescale the red and green components to preserve the relative ratios of the three components.
(3) Limit the blue component by the maximum allowable blue value and rescale the red component to preserve the relative ratio of the blue and red components, leaving the green component unchanged.

Option (2) above is less desirable, since resealing both the red and the green components results in a darkening rather than a brightening. Options (1) and (3) work well. In general, differences between options (1) and (3) are not very noticeable and can be simulated by altering the blue gain factor. Therefore, it may be desirable to implement the simpler option (1).

Although the invention has been described in the context of a fixed size detection area 101, an optional embodiment adjusts the size of the detection area 101 according to the pixel luma (Y) value. By way of example, increasing the size of the detection area 101 (and the associated soft transition boundary 110) linearly with the value of Y, for Y in the range of 235 and 255, has been found to work well.

Since both the area parameter 103 and the soft boundary parameter s affect the overall detection area, increasing s not only results in color blending, but also affects whether colors around the white range are changed as well. Therefore, when tuning the parameters it is desirable to change the area parameter 103 and the soft boundary parameter s together.

As described above, the Y_Option and the G_Option are used to prevent light skin-tone colors from changing. Optionally, it is possible to turn off either the Y_Option or the G_Option while still protecting the skin-tone colors. However, turning off both the Y_Option and the G_Option may result in undesirable skin-tone changes.

Figure 4:
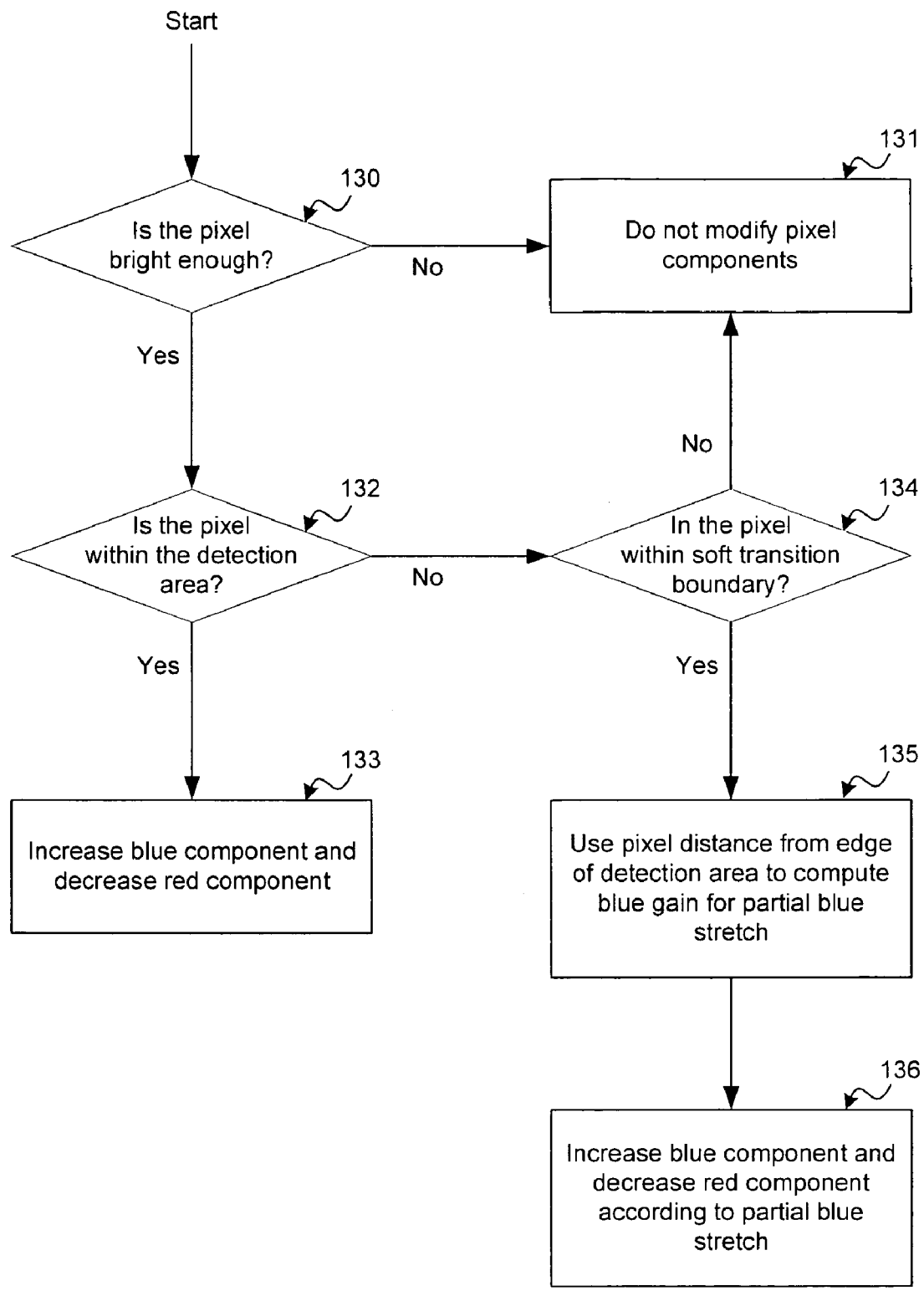
FIG. 4 is a flow diagram illustrating a method for applying blue stretch, in accordance with an embodiment of the present invention.

FIG. 4 is a flow diagram illustrating a method for applying blue stretch, in accordance with an embodiment of the present invention. If 130 the pixel under consideration is not bright enough, do not 131 alter its component values. Otherwise, if 132 the pixel is within the detection area 101, increase 133 the blue component and decrease the red component of the pixel (according to parameters described above). If the pixel is bright enough and outside of the detection area but falls 134 within the soft transition boundary 110, use the pixel distance from the edge of the detection area 101 to compute 135 an appropriate blue gain for a partial blue stretch, and partially blue stretch 136 the pixel. If the pixel is bright enough but falls outside of the detection area 101 and the soft transition boundary 110, do not 131 alter the pixel component values.

The present invention can be embodied in software or middleware, or in computer hardware such as in an Application Specific Integrated Circuit (ASIC) or other integrated circuit. A hardware embodiment may optionally be coupled, or reside in, a display apparatus, a graphics card or any other apparatus for processing and/or presenting visual information.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by claims following.

We claim:

1. A method for applying blue stretch to a pixel, comprising:
   determining whether the pixel falls within a detection area in the UV-plane and has a luma (Y) value greater than a luma threshold;
   applying blue stretch to the pixel when the pixel falls within the detection area;
   determining whether the pixel falls within a transition area surrounding the detection area in the UV-plane; and
   applying partial blue stretch to the pixel when the pixel falls outside the detection area but within the transition area, wherein partial blue stretch reduces visible boundaries between pixels that are blue stretched and pixels that are not blue stretched;
   whereby adjustments to pixels in one or more color ranges are kept small by limiting the detection area in the one or more color ranges of the UV-plane.

2. A method as recited in claim 1, wherein the detection area is limited by a first boundary line above a detection axis and a second boundary line below the detection axis, the detection axis positioned along the white and near white colors in the YUV-color space.

3. A method as recited in claim 1, wherein the one or more color ranges comprise flesh-tone colors.

4. A method as recited in claim 1, wherein the detection area is limited in the yellow-orange region of the UV-plane by a first boundary line.

5. A method as recited in claim 1, wherein the detection area is limited in the yellow-green region of the UV-plane by a second boundary line.

6. A method as recited in claim 1, wherein applying blue stretch comprises increasing the blue component of the pixel by a blue gain factor.

7. A method as recited in claim 6, wherein applying blue stretch further comprises decreasing the red component of the pixel according to the blue gain factor.

8. A method as recited in claim 6, wherein applying partial blue stretch comprises increasing the blue component of the pixel by a fraction of the blue gain factor, wherein the fraction of the blue gain factor decreases with increasing pixel distance from the detection area.

9. A method as recited in claim 8, wherein the fraction of the blue gain factor
   decreases linearly with increasing pixel distance from the detection area.

10. A method as recited in claim 8, wherein applying partial blue stretch comprises decreasing the red component of the pixel by the fraction of the blue gain factor.

11. A method as recited in claim 1, wherein the detection area is limited by a boundary line for controlling the saturation range in which blue stretch is applied.

12. The method of claim 6 wherein the blue component is set to the maximum allowable value when increasing the blue component of the pixel exceeds the maximum allowable value of the blue component.

13. The method of claim 12 wherein one or more color components are rescaled to preserve the relative ratios of the one or more components with respect to the blue component when increasing the blue component of the pixel exceeds the maximum allowable value of the blue component.

14. The method of claim 1 wherein the detection area is adjusted according to changes in the luma threshold.

15. An apparatus for applying blue stretch to a pixel, comprising:
   a controller for:
   (a) receiving luma (Y) and chroma (UV) values describing the pixel;
   (b) determining whether the pixel falls within a detection area in the UV-plane and has a luma value greater than a luma threshold;
   (c) applying blue stretch to the pixel when the pixel falls within the detection area;
   (d) determining whether the pixel falls within a transition area surrounding the detection area in the UV-plane; and
   (e) applying partial blue stretch to the pixel when the pixel falls outside the detection area but within the transition area, wherein partial blue stretch reduces visible boundaries between pixels that are blue stretched and pixels that are not blue stretched;
   whereby adjustments to one or more color ranges are kept small by limiting the detection area in the one or more color ranges of the UV-plane.

16. An apparatus as recited in claim 15, further comprising a display for displaying the pixel.

17. An apparatus as recited in claim 15, wherein the detection area is limited by a first boundary line above a detection axis and a second boundary line below the detection axis, the detection axis positioned along the white and near white colors in the YUV-color space.

18. An apparatus as recited in claim 15, wherein the one or more color ranges comprise flesh-tone colors.

19. An apparatus as recited in claim 15, wherein the detection area is limited in the yellow-orange region of the UV-plane by a first boundary line.

20. An apparatus as recited in claim 15, wherein the detection area is limited in the yellow-green region of the UV-plane by a second boundary line.

21. An apparatus as recited in claim 20, wherein the detection area is limited by a boundary line for controlling the saturation range in which blue stretch is applied.

22. An apparatus as recited in claim 15, wherein applying blue stretch comprises increasing the blue component of the pixel by a blue gain factor.

23. An apparatus as recited in claim 22, wherein applying blue stretch further comprises decreasing the red component of the pixel according to the blue gain factor.

24. An apparatus as recited in claim 22 wherein the blue component is set to the maximum allowable value when increasing the blue component of the pixel exceeds the maximum allowable value of the blue component.

25. An apparatus as recited in claim 24 wherein one or more color components are rescaled to preserve the relative ratios of the one or more components with respect to the blue component when increasing the blue component of the pixel exceeds the maximum allowable value of the blue component.

26. An apparatus as recited in claim 15, wherein applying partial blue stretch comprises increasing the blue component of the pixel by a fraction of the blue gain factor, wherein the fraction of the blue gain factor decreases with increasing pixel distance from the detection area.

27. An apparatus as recited in claim 26, wherein the fraction of the blue gain factor
    decreases linearly with increasing pixel distance from the detection area.

28. An apparatus as recited in claim 26, wherein applying partial blue stretch comprises decreasing the red component of the pixel by the fraction of the blue gain factor.

29. An apparatus as recited in claim 15 wherein the detection area is adjusted according to changes in the luma threshold.

\* \* \* \* \*